(12) United States Patent
Taguchi (10) Patent No.: US 10,897,106 B2
(45) Date of Patent: Jan. 19, 2021

(54) CHARGER FOR ELECTRICALLY CHARGING A MOVING BODY

(71) Applicant: Toyota Jidosha Kabushiki Kaisha, Toyota (JP)

(72) Inventor: Etsushi Taguchi, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/524,579

(22) Filed: Jul. 29, 2019

(65) Prior Publication Data

US 2020/0036139 A1    Jan. 30, 2020

(30) Foreign Application Priority Data

Jul. 30, 2018    (JP) .................................. 2018-142109

(51) Int. Cl.
| | |
|---|---|
| *H01R 12/00* | (2006.01) |
| *H01R 13/648* | (2006.01) |
| *H01R 13/17* | (2006.01) |
| *H01R 13/62* | (2006.01) |
| *H02J 7/00* | (2006.01) |

(52) U.S. Cl.
CPC ......... *H01R 13/6485* (2013.01); *H01R 13/17* (2013.01); *H01R 13/6205* (2013.01); *H02J 7/0045* (2013.01)

(58) Field of Classification Search
CPC ...................... H01R 12/75; H05K 2201/09709
USPC ................. 439/39, 924.1, 924.2, 60
See application file for complete search history.

(56) References Cited

U.S. PATENT DOCUMENTS

| | | | | |
|---|---|---|---|---|
| 5,909,065 A | * | 6/1999 | Jones | ..................... H02H 9/004 307/147 |
| 2007/0072443 A1 | * | 3/2007 | Rohrbach | ................. G06F 1/18 439/39 |
| 2012/0108106 A1 | | 5/2012 | de Chazal | |
| 2013/0181793 A1 | | 7/2013 | Bauer et al. | |
| 2015/0270729 A1 | | 9/2015 | Isobe | |

FOREIGN PATENT DOCUMENTS

| | | |
|---|---|---|
| CN | 103038850 A | 4/2013 |
| CN | 103201912 A | 7/2013 |
| CN | 104953057 A | 9/2015 |
| EP | 2923880 A2 | 9/2015 |
| GB | 700999 A | 12/1953 |
| JP | 6115502 B2 | 4/2017 |

* cited by examiner

*Primary Examiner* — Phuong K Dinh
(74) *Attorney, Agent, or Firm* — Dinsmore & Shohl LLP (57) ABSTRACT

The charger includes first and second connectors, each including an opposing surface. One of the opposing surface of the first connector and the opposing surface of the second connector includes, on a first opposing surface, a male power terminal and a male signal terminal for a power cutoff signal projecting from the first opposing surface, and the other one of the opposing surface of the first connector and the opposing surface of the second connector is provided with a female power terminal which the male power terminal is to be fitted into and a female signal terminal which the male signal terminal is to be fitted into on a second opposing surface. A length of the male signal terminal in a direction in which the male signal terminal projects is shorter than a length of the male power terminal in a direction in which the male power terminal projects.

5 Claims, 11 Drawing Sheets

CHARGER FOR ELECTRICALLY CHARGING A MOVING BODY

CROSS REFERENCE TO RELATED APPLICATIONS

This application is based upon and claims the benefit of priority from Japanese patent application No. 2018-142109, filed on Jul. 30, 2018, the disclosure of which is incorporated herein in its entirety by reference.

BACKGROUND

The present disclosure relates to a charger.

It is necessary to supply power to moving bodies capable of autonomous movement, such as life support robots, from an external power supply to charge their batteries. For example, Japanese Patent No. 6115502 discloses a charger including a first connector provided on a power supply side and a second connector provided on a moving body side. The charger is configured to be charged in a state in which the first and second connectors are connected to each other by a magnetic force.

SUMMARY

In the charger of Japanese Patent No. 6115502, when the connection between the first connector and the second connector is disconnected, for example, due to a movement of the moving body while charging, an electric arc may occur.

The present disclosure has been made in view of the above circumstances. An object of the present disclosure is to provide a charger capable of effectively preventing an electric arc from occurring even when the connection between the first connector and the second connector is disconnected while charging.

An example aspect of the present disclosure is a charger including: a first connector provided on a power supply side; and a second connector provided on a moving body side. The charger is configured to be charged in a state in which the first connector and the second connector are connected to each other by a magnetic force. The first connector and the second connector include opposing surfaces facing each other. One of the opposing surface of the first connector and the opposing surface of the second connector includes, on a first opposing surface, a male power terminal and a male signal terminal for a power cutoff signal projecting from the first opposing surface, and the other one of the opposing surface of the first connector and the opposing surface of the second connector is provided with a female power terminal which the male power terminal is to be fitted into and a female signal terminal which the male signal terminal is to be fitted into on a second opposing surface. A length of the male signal terminal in a direction in which the male signal terminal projects is shorter than a length of the male power terminal in a direction in which the male power terminal projects.

When the first connector is separated from the second connector, firstly the connection between the male signal terminal and the female signal terminal for the power cutoff signal is disconnected. Then, after the connection between the male signal terminal and the female signal terminal is disconnected, the connection between the male power terminal and the female power terminal is disconnected. That is, when the connection between the first connector and the second connector is disconnected while charging, the connection between the male signal terminal and the female signal terminal is disconnected, and the current supply from the power supply to the first connector is cut off by a current cutoff mechanism before the male power terminal is disconnected from the female power terminals. Thus, when the connection between the male power terminal and the female power terminal is disconnected, the male power terminal and the female power terminal are not conducted, which effectively prevents an electric arc from occurring.

Further, on the first opposing surface, the male signal terminal may be disposed at a central part, and a plurality of the male power terminals may be disposed on a circumference centered on the central part. On the second opposing surface, the female signal terminal may be disposed at a central part, and a plurality of the female power terminals may be disposed on a circumference centered on the central part. When a straight line passing two points of a position of the male signal terminal and a position of the male power terminal on the first opposing surface is defined as a first straight line, a straight line passing two points of an intersection point between the first straight line and an outer edge of the first opposing surface and a leading end of the male signal terminal is defined as a second straight line, and a straight line passing two points of the intersection point and a leading end of the male power terminal is defined as a third straight line, the length of the male power terminal in the direction in which the male power terminal projects and the length of the male signal terminal in the direction in which the male signal terminal projects may be set in such a way that a first angle, which is an elevation angle formed between the first opposing surface and the second straight line, becomes greater than a second angle, which is an elevation angle formed between the first opposing surface and the third straight line.

Suppose that the lengths of the male power terminals in the projecting direction and the length of the male signal terminal in the projecting direction are set in such a way that the second angle becomes smaller than the first angle. By doing so, when the first opposing surface and the second opposing surface are in contact with each other at only the intersection point, all the pairs of the male power terminals and the female power terminals are connected if the male signal terminal is connected to the female signal terminal. Thus, when the male signal terminal and the female signal terminal are connected to each other, and the first connector and the second connector are conducted, it is possible to prevent one of the pairs of the male power terminals and the female power terminals from being disconnected, and current from being concentrated on another one of the pairs, and thereby preventing the temperature from excessively rising.

Further, the male power terminal may include an elastic member exerting an elastic force in the direction in which the male power terminal projects from the first opposing surface. When a third angle, which is an elevation angle formed between the first opposing surface and the second opposing surface, is smaller than the first angle in a state in which a part of the second opposing surface is physically in contact with the outer edge of the first opposing surface, the elastic force of the elastic member may be set in such a way that a contact resistance between the male power terminal and the female power terminal becomes smaller than a predetermined value.

By doing so, even when the male power terminals and the female power terminals are conducted in a state in which the first opposing surface and the second opposing surface cannot be completely brought close to each other, such as when a foreign matter is sandwiched therebetween, it is possible to effectively prevent the temperature of the parts where the male power terminals are in contact with the female power terminals from excessively rising.

According to the present disclosure, it is possible to effectively prevent an electric arc from occurring even when the connection between the first connector and the second connector is disconnected while charging.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to an embodiment of the present disclosure, the present disclosure according to claims is not limited to the following embodiment. Moreover, all the components described in the following embodiment are not necessarily indispensable for means to solve problems. For the clarification of the description, the following description and the drawings may be omitted or simplified as appropriate. Throughout the drawings, the same components are denoted by the same reference signs and repeated descriptions will be omitted as appropriate. Further, in the drawings, the dimensions of the components are drawn in a deformed and distorted manner in order to contribute to easy understanding.

First, a configuration of the charger according to this embodiment will be described with reference to FIG. 1.

Figure 1:
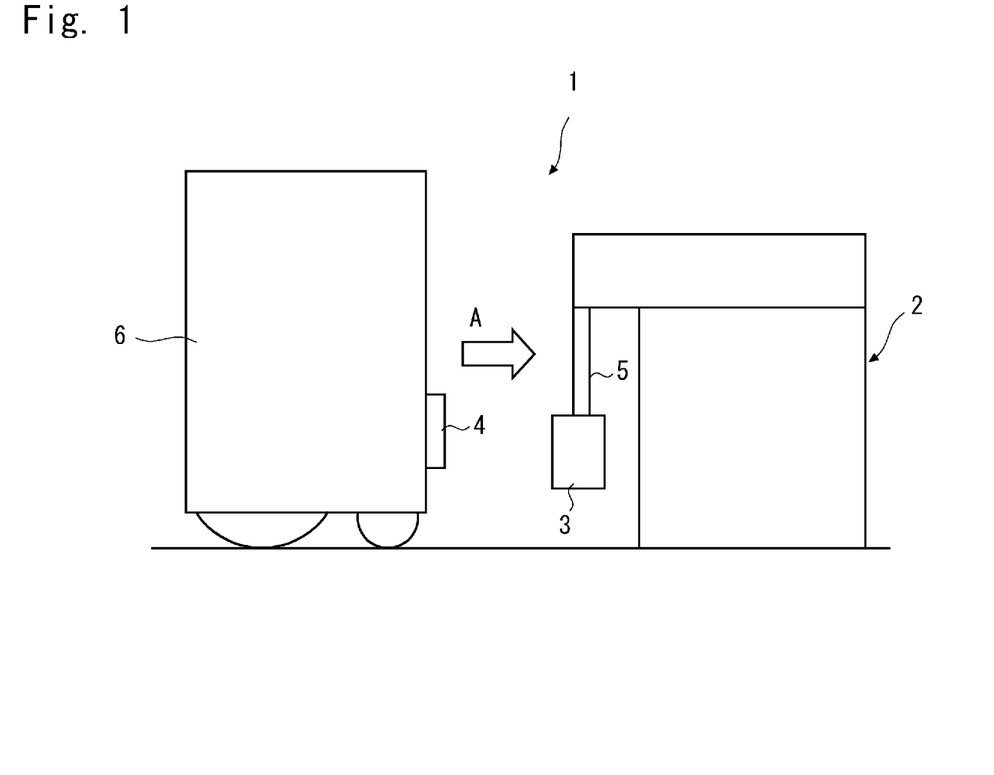
FIG. 1 is a schematic view showing a configuration example of a charger according to an embodiment.

FIG. 1 is a schematic view showing an example of the configuration of the charger 1 according to this embodiment. As shown in FIG. 1, a charger 1 includes a charger body 2, a first connector 3, and a second connector 4.

The charger body 2 has a power supply. The first connector 3 is provided on the power supply side, i.e., on the charger body 2. The charger body 2 supplies power to the first connector 3 via a wire 5. The second connector 4 is provided on the moving body 6 side. The first connector 3 and the second connector 4 are connected to each other by a magnetic force.

The moving body 6 is a common robot (e.g., a life support robot) that includes a battery mounted thereon, acquires power from the battery, and moves autonomously. The moving body 6 is not limited to an autonomously moving robot, and may be a robot operated via a wireless controller or the like as long as it has a battery mounted thereon.

Figure 2:
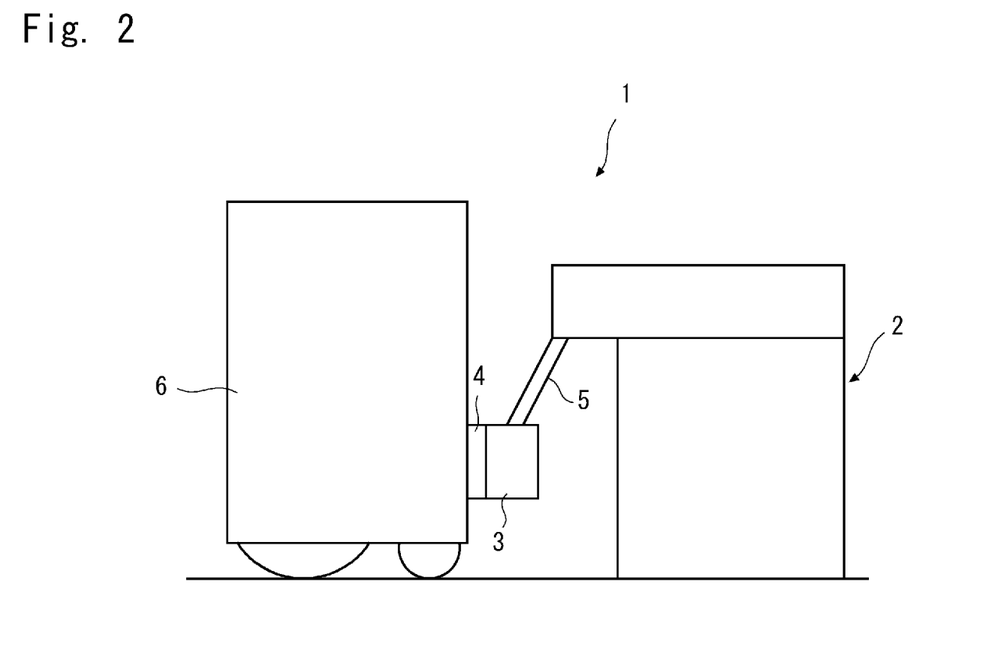
FIG. 2 is a schematic view showing a state in which a first connector and a second connector are connected to each other in the charger according to this embodiment.

FIG. 2 is a schematic view showing a state in which the first connector 3 and the second connector 4 are connected to each other. As shown in FIG. 2, the charger 1 is configured to be charged in a state in which the first connector 3 and the second connector 4 are connected to each other by a magnetic force.

Next, configurations of the first connector 3 and the second connector 4 will be described.

Figure 3:
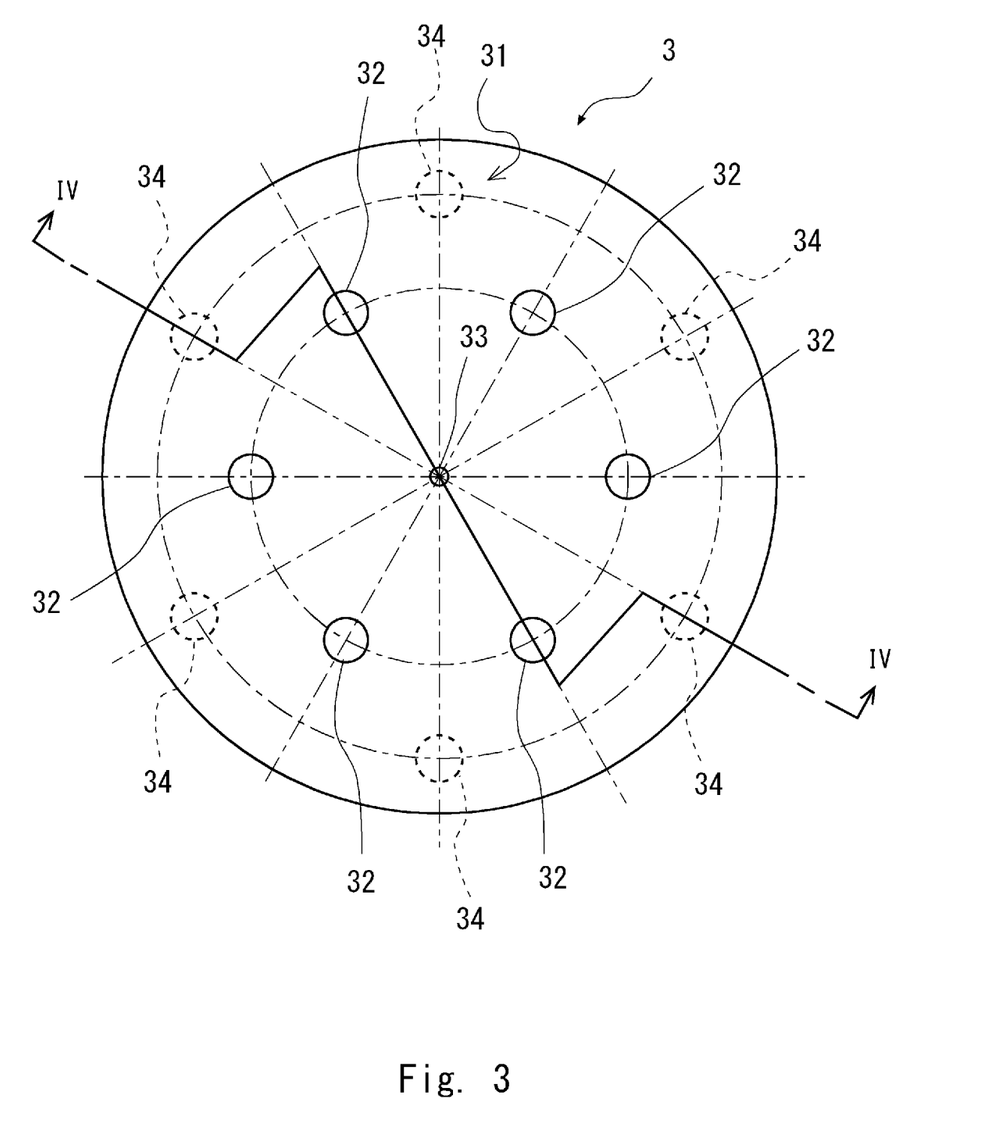
FIG. 3 is a schematic view showing a configuration example of the first connector.
Figure 4:
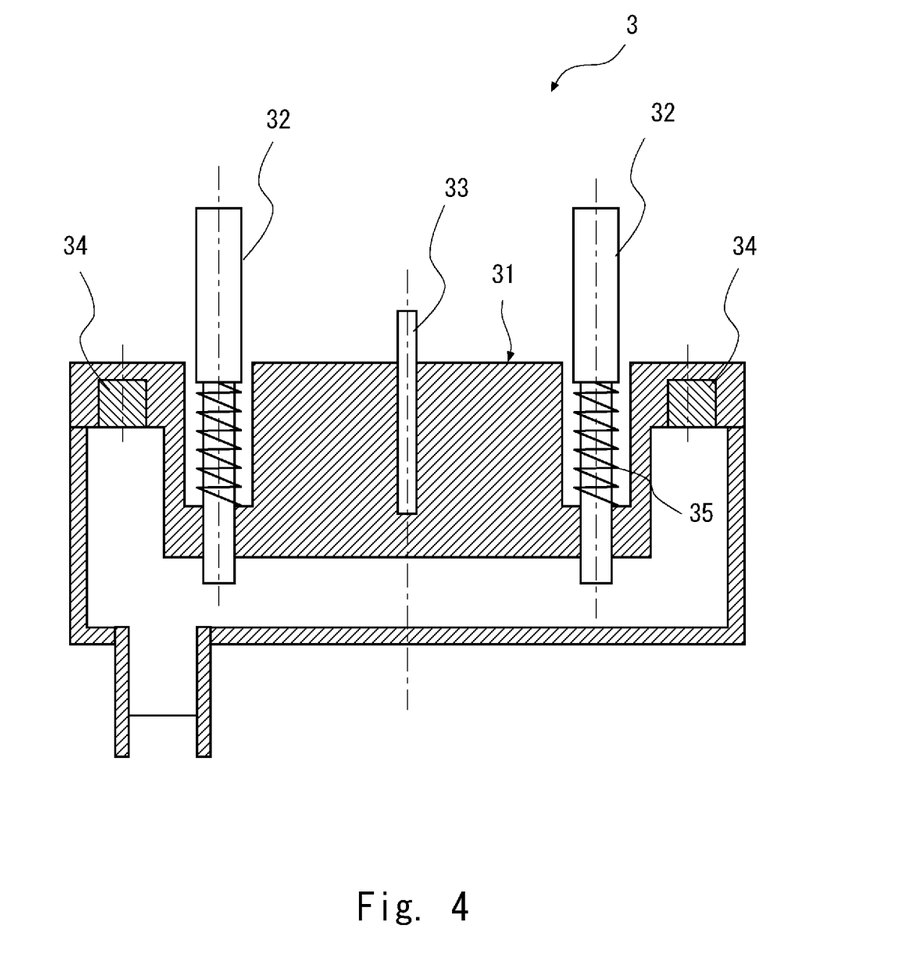
FIG. 4 is a cross-sectional view taken along the line IV-IV of FIG. 3.
Figure 5:
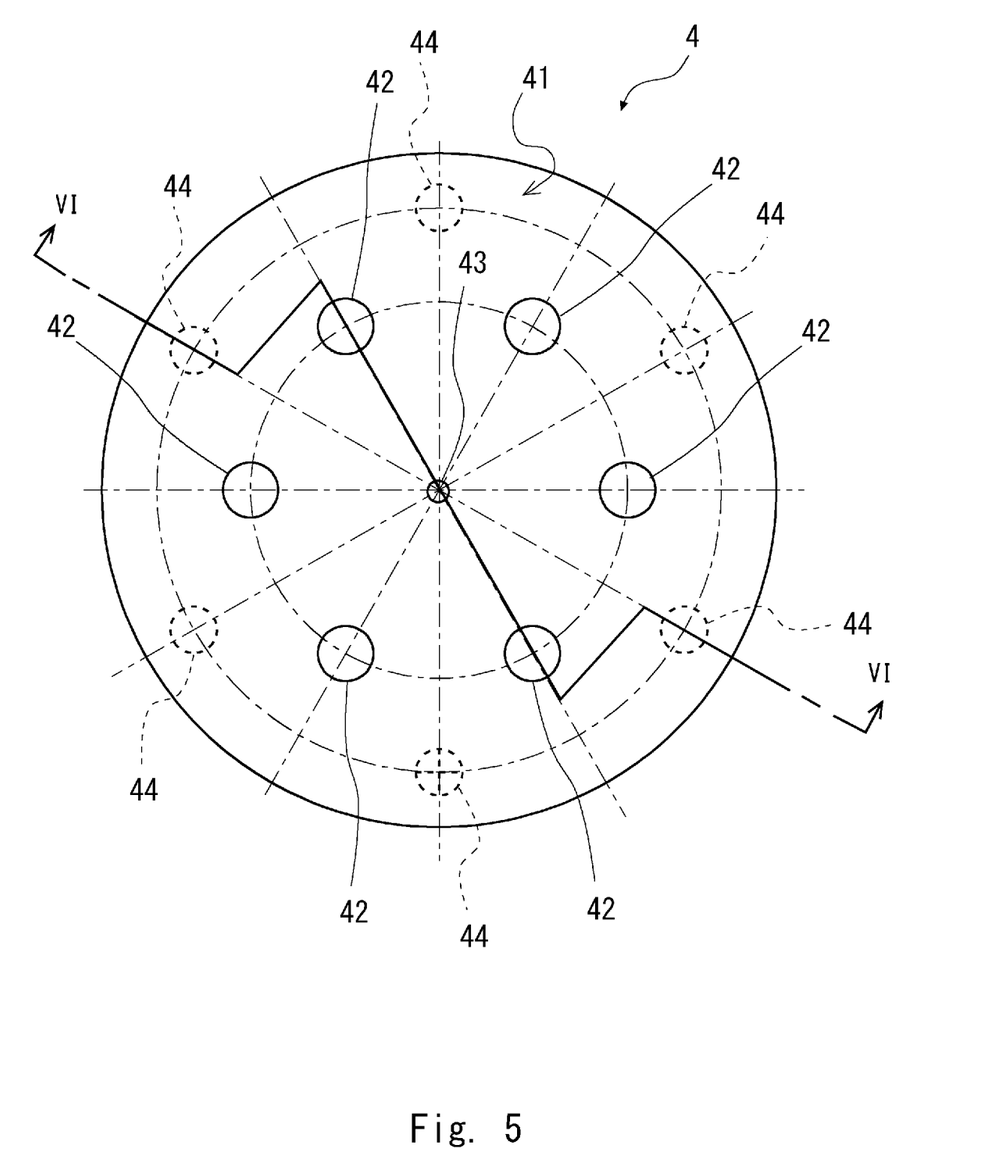
FIG. 5 is a schematic view showing a configuration example of a second connector.
Figure 6:
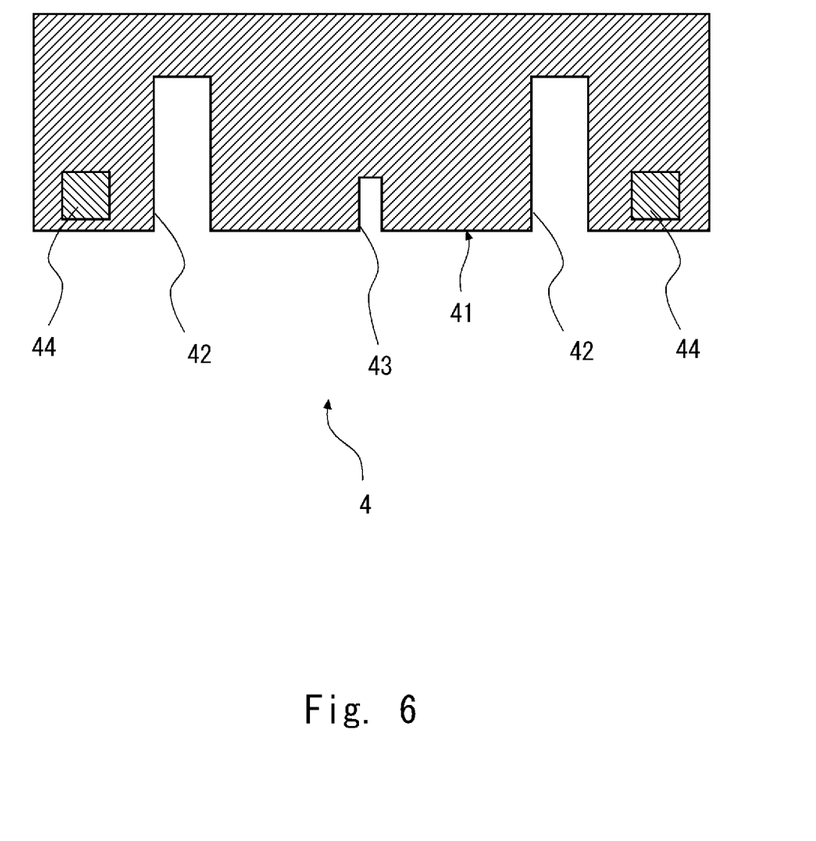
FIG. 6 is a cross-sectional view taken along the line VI-VI of FIG. 5.

FIG. 3 is a schematic view for describing an example of the configuration of the first connector 3. FIG. 4 is a cross-sectional view taken along the line IV-IV of FIG. 3. FIG. 5 is a schematic view for describing an example of the configuration of the second connector 4. FIG. 6 is a cross-sectional view taken along the line VI-VI of FIG. 5.

As shown in FIGS. 3 and 4, the first connector 3 includes a first opposing surface 31. The first opposing surface 31 is provided with male power terminals 32 and a male signal terminal 33 for a power cutoff signal. The male power terminals 32 and the male signal terminal 33 project from the first opposing surface 31. Each of the male power terminal 32 may include an elastic member 35 (see FIG. 4) that exerts an elastic force in a direction in which the male power terminal 32 projects from the first opposing surface 31. A method of setting the elastic force when the male power terminal 32 has the elastic member 35 will be described later. The male signal terminal 33 is disposed, for example, at a central part of the first connector 3, and the male power terminals 32 are disposed, for example, on a circumference centered on the central part of the first connector 3. The first connector 3 is provided with a magnet 34 which is a permanent magnet.

As shown in FIGS. 5 and 6, the second connector 4 includes a second opposing surface 41 that is an opposing surface facing the first opposing surface 31 of the first connector 3 (see FIGS. 3 and 4). The second opposing surface 41 is provided with female power terminals 42 which the male power terminals 32 of the first connector 3 are to be fitted into and a female signal terminal 43 which the male signal terminal 33 of the first connector 3 (see FIGS. 3 and 4) is to be fitted into. The female signal terminal 43 is disposed, for example, at a central part of the second connector 4, and the female power terminals 42 are disposed, for example, on a circumference centered on the central part of the second connector 4. The second connector 4 is provided with a magnet 44 which is a permanent magnet.

In the second connector 4, the magnet 44 is provided at a position corresponding to a position of the magnet 34 (see FIGS. 3 and 4) of the first connector 3 when the first connector 3 (see FIGS. 3 and 4) and the second connector 4 are connected to each other. The magnet 44 has a polarity opposite to that of the magnet 34 disposed at a position facing the magnet 44 when the first connector 3 and the second connector 4 are connected to each other. That is, when the first connector 3 and the second connector 4 are connected to each other, if one of the polarities of the magnets 34 and 44 which are disposed at positions facing each other is an N-pole, the other one of the polarities of the magnets 34 and 44 is an S-pole. With such configuration, as shown in FIG. 1, when the moving body 6 is moved in a direction of the arrow A to reduce the distance between the first connector 3 and the second connector 4 which are in a separated state, the first connector 3 and the second connector 4 attract each other by the magnetic force as shown in FIG. 2. Then, the first connector 3 and the second connector 4 are connected to each other, and the male power terminal 32 in the first connector 3 is electrically connected to the female power terminal 42 in the second connector 4.

The charger body 2 shown in FIGS. 1 and 2 is provided with a current cutoff mechanism. When the male signal terminal 33 (see FIG. 3 and FIG. 4) and the female signal terminal 43 (see FIG. 5 and FIG. 6) are connected to each other, the current cutoff mechanism is configured in such a way that current is supplied from a power supply to the first connector 3. On the other hand, when the male signal terminal 33 and the female signal terminal 43 are not connected to each other, the current cutoff mechanism operates in such a way to cut off the current supply from the power supply to the first connector 3.

Next, a relationship between the lengths of the male power terminals 32 and the male signal terminal 33 in a direction in which the male power terminals 32 and the male signal terminal 33 project (hereinafter referred to as a projecting direction) will be described.

Figure 7:
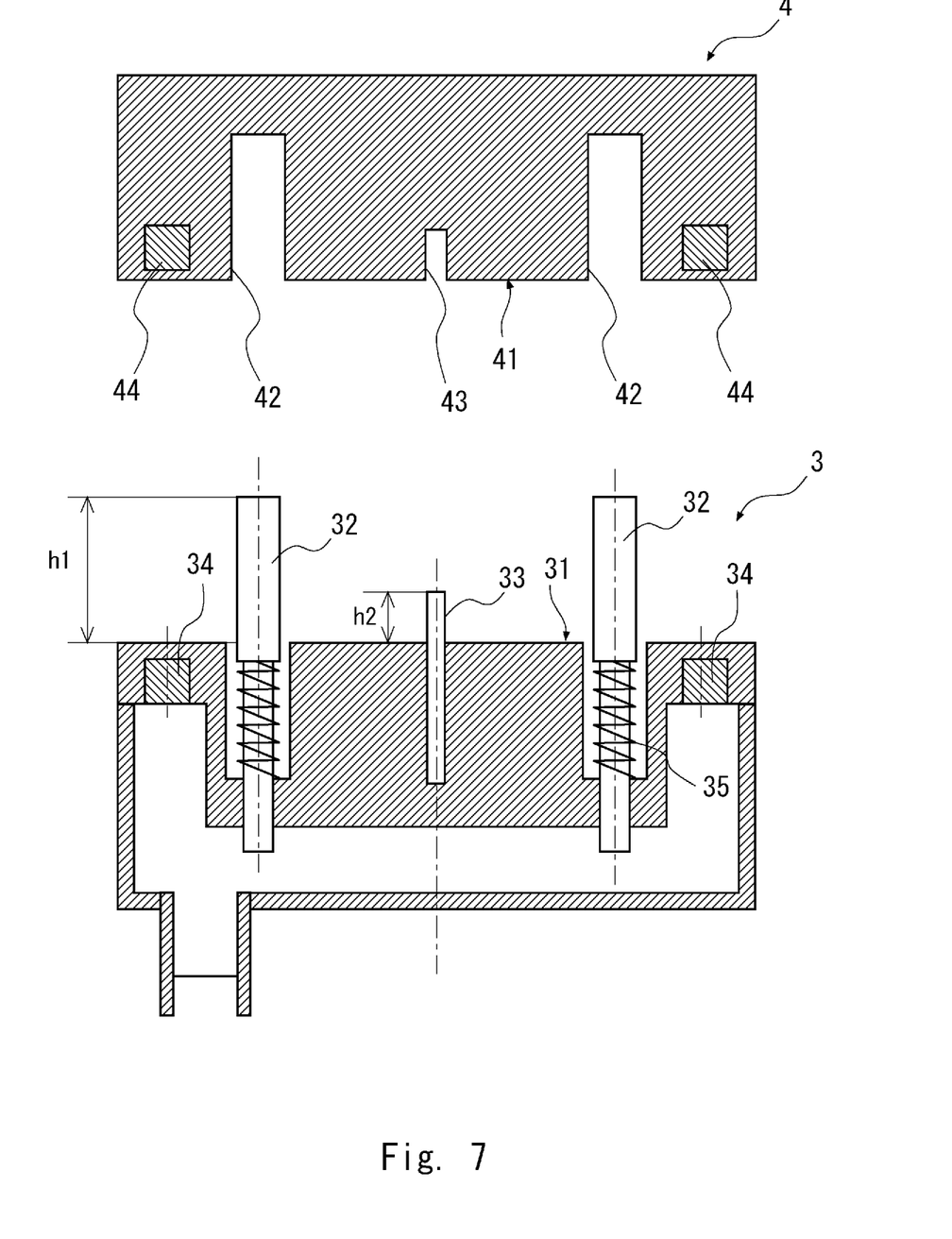
FIG. 7 is a schematic view for describing a relationship between lengths of male power terminals and a male signal terminal in the first connector in a projecting direction.
Figure 8:
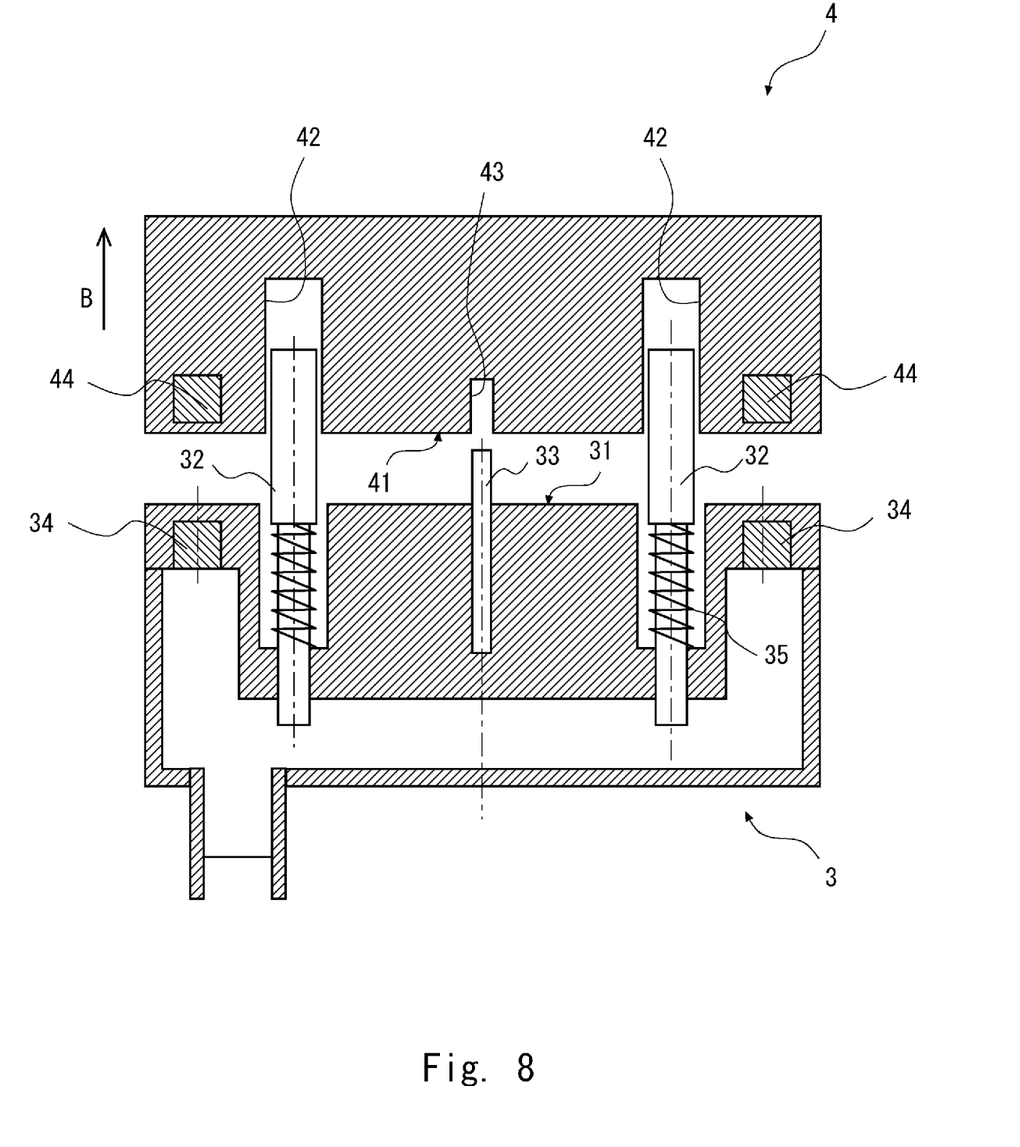
FIG. 8 is a schematic view for describing a relationship between the lengths of the male power terminals and the male signal terminal in the first connector in the projecting direction.

FIGS. 7 and 8 are schematic views for describing the relationship between the lengths of the male power terminals 32 and the male signal terminal 33 in the projecting direction in the first connector 3. As shown in FIG. 7, a length h2 of the male signal terminal 33 in the projecting direction is shorter than a length h1 of the male power terminal 32 in the projecting direction.

With such a configuration of the male power terminals 32 and the male signal terminal 33, as shown in FIG. 8, when the second connector 4 moves in a direction of the arrow B to separate the first connector 3 and the second connector 4 from each other, firstly the connection between the male signal terminal 33 and the female signal terminal 43 for the power cutoff signal is disconnected. Then, after the connection between the male signal terminal 33 and the female signal terminal 43 is disconnected, the connections between the male power terminals 32 and the female power terminals 42 are disconnected. That is, when the connection between the first connector 3 and the second connector 4 is disconnected while charging, the connection between the male signal terminal 33 and the female signal terminal 43 is disconnected, and the current supply from the power supply to the first connector 3 is cut off by the current cutoff mechanism before the male power terminals 32 are disconnected from the female power terminals 42. Thus, when the connections between the male power terminals 32 and the female power terminals 42 are disconnected, the male power terminals 32 and the female power terminals 42 are not conducted, which effectively prevents an electric arc from occurring.

Figure 9:
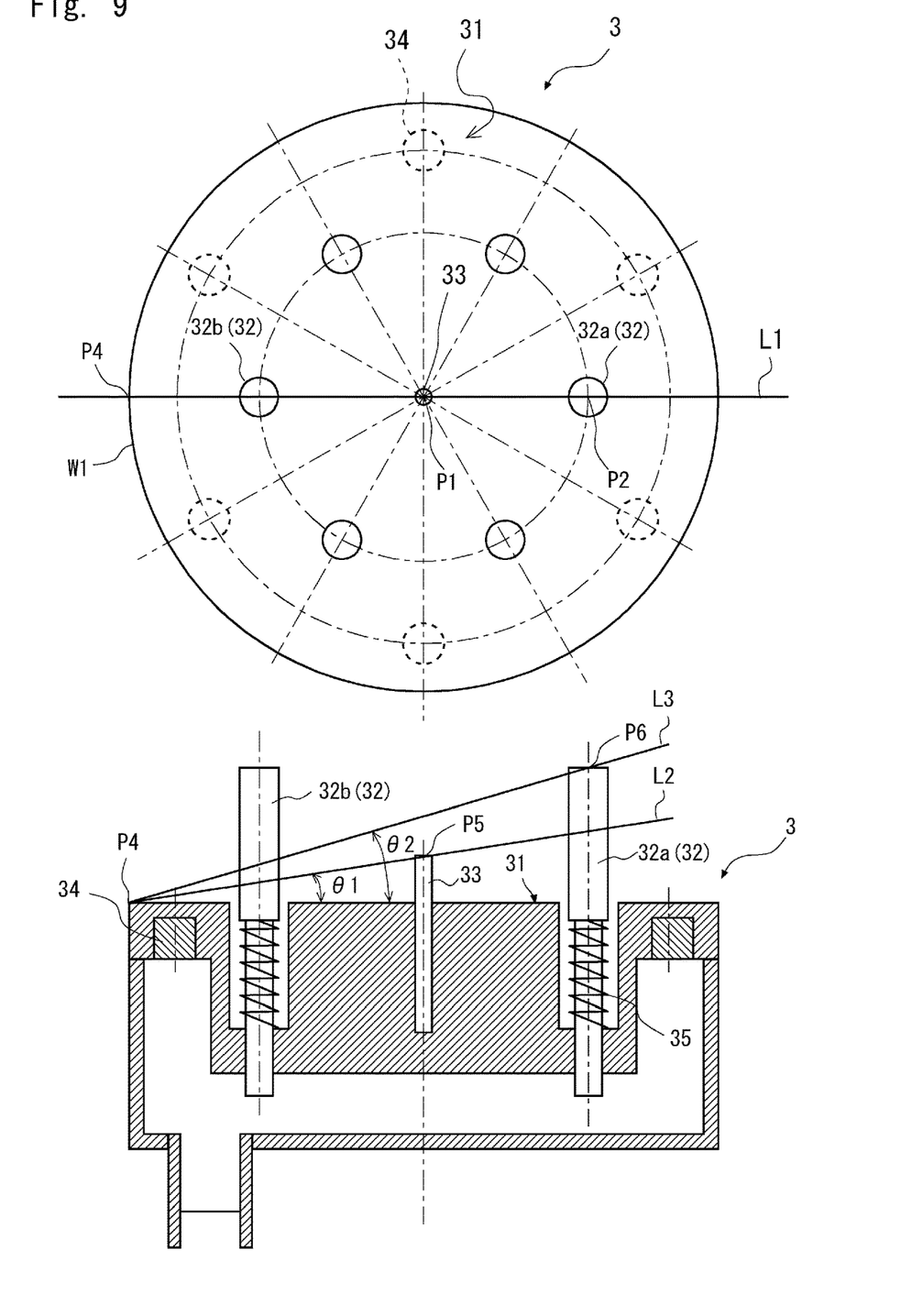
FIG. 9 is a schematic view for describing a relationship between the lengths of the male power terminals and the male signal terminal in the first connector in the projecting direction.
Figure 10:
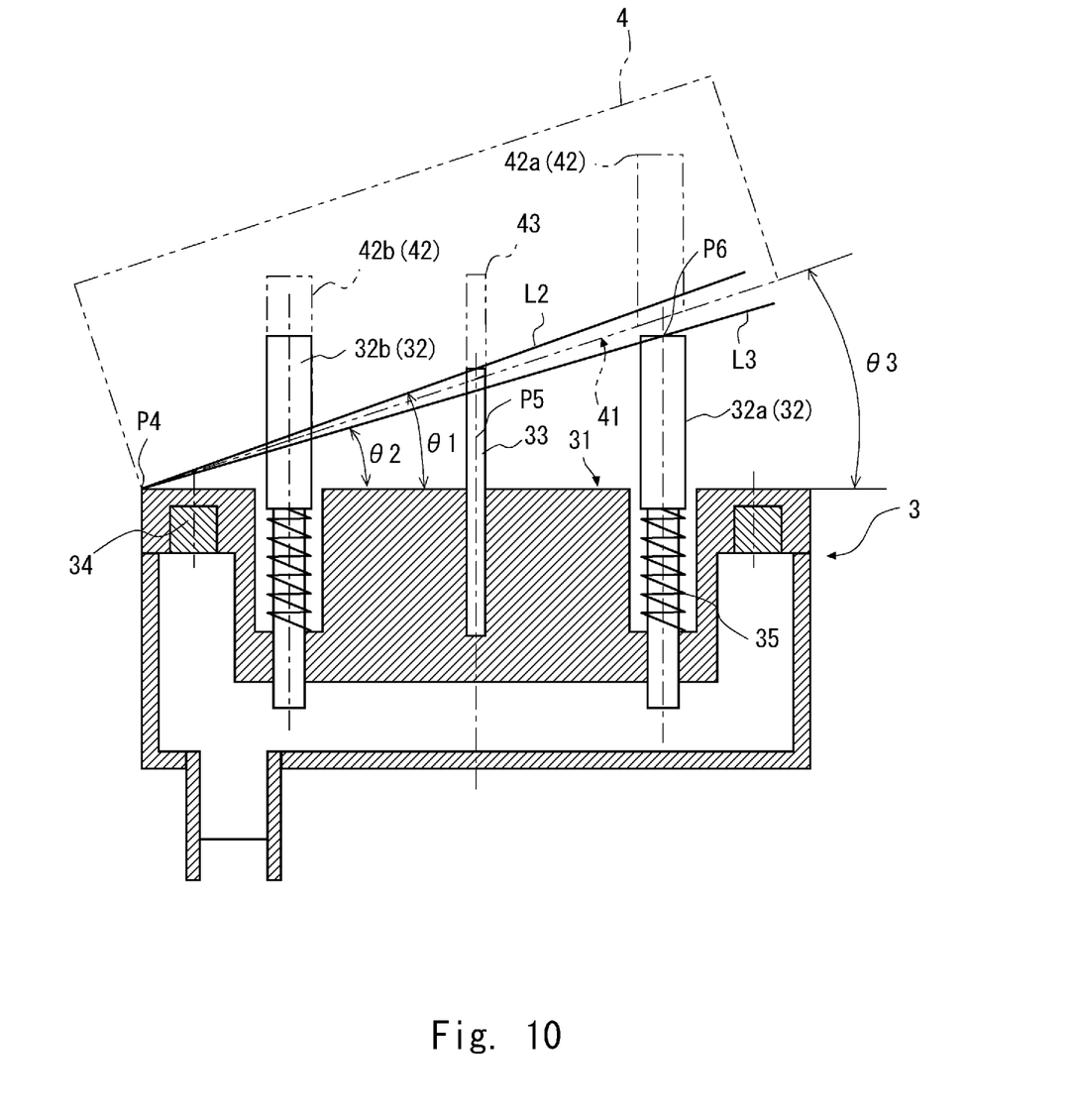
FIG. 10 is a schematic view for describing a relationship between the lengths of the male power terminals and the male signal terminal in the first connector in the projecting direction.
Figure 11:
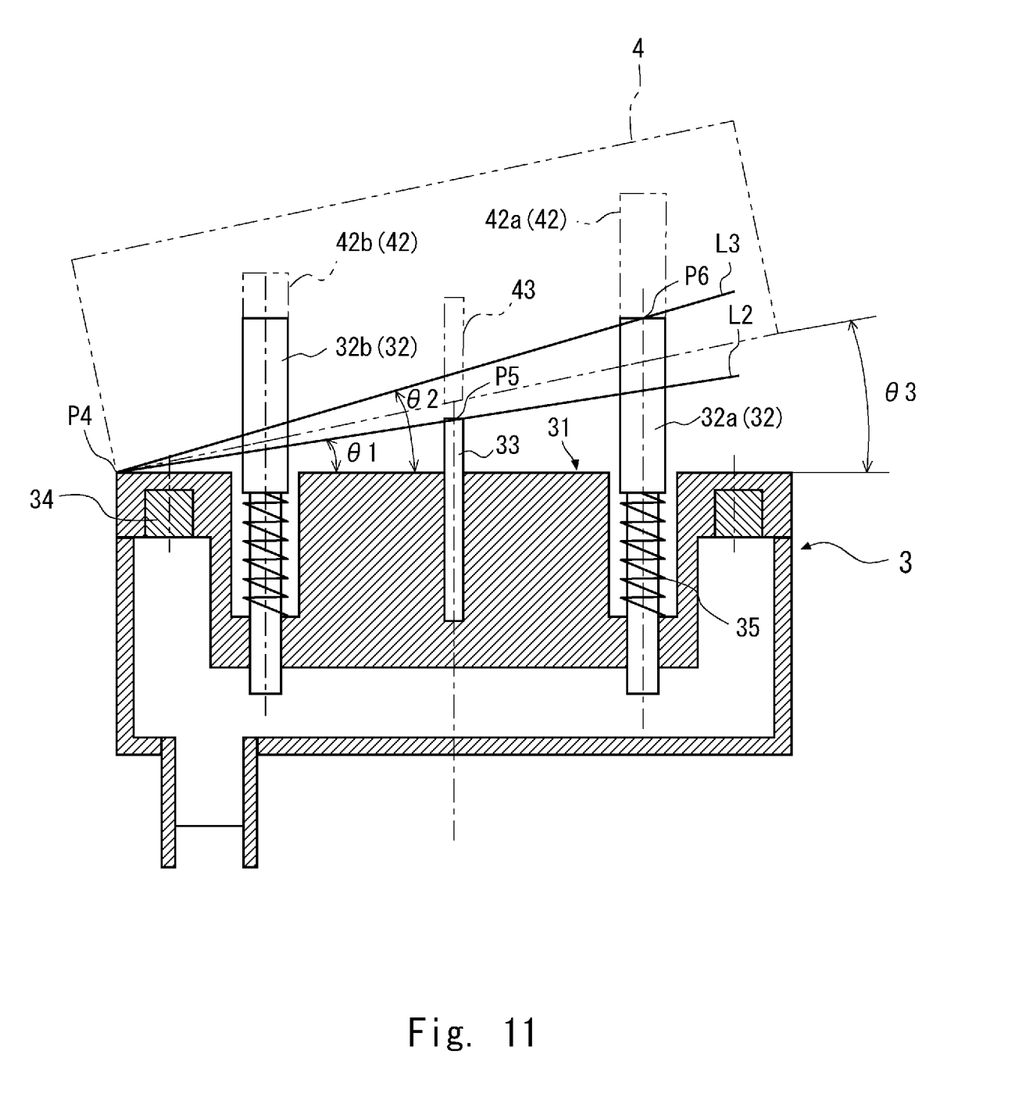
FIG. 11 is a schematic view for describing a relationship between the lengths of the male power terminals and the male signal terminal in the first connector in the projecting direction.

FIGS. 9 to 11 is a schematic view for describing a relationship between lengths of the male power terminals 32 and the male signal terminal 33 in the first connector 3 in the projecting direction. As shown in FIG. 9, in the first opposing surface 31, the male signal terminal 33 is disposed at the central part, and the plurality of male power terminals 32 are disposed on a circumference centered on the central part. In the second opposing surface 41, the female signal terminal 43 and the plurality of female power terminals 42 are provided at positions corresponding to the male signal terminal 33 and the plurality of male power terminals 32, respectively, in the first opposing surface 31. That is, in the second opposing surface 41, the female signal terminal 43 is disposed at the central part, and the plurality of female power terminals 42 are disposed on the circumference centered on the central part.

In FIG. 9, a plan view of the first connector 3 is shown on the upper side, and a side view of the first connector 3 is shown on the lower side. As shown in the upper side of FIG. 9, a straight line passing two points of a position P1 of the male signal terminal 33 and a position P2 of the male power terminal 32 (32a) on the first opposing surface 31 is defined as a first straight line L1. As shown in the lower side of FIG. 9, a straight line passing two points of an intersection point P4 of the first straight line L1 and an outer edge WI of the first opposing surface 31 and a leading end P5 of the male signal terminal 33 is defined as a second straight line L2. A straight line passing two points of the intersection point P4 and a leading end P6 of the male power terminal 32 (32a) is defined as a third straight line L3. An elevation angle formed between the first opposing surface 31 and the second straight line L2 is defined as a first angle $\theta 1$. An elevation angle formed between the first opposing surface 31 and the third straight line L3 is defined as a second angle $\theta 2$. In some embodiments, the lengths of the male power terminals 32 in the projecting direction and the length of the male signal terminal 33 in the projecting direction be set in such a way that the second angle $\theta 2$ becomes larger than the first angle $\theta 1$ ($\theta 1 < \theta 2$).

As shown in FIG. 10, the lengths of the male power terminals 32 in the projecting direction and the length of the male signal terminal 33 in the projecting direction are set in such a way that the second angle $\theta 2$ becomes smaller than the first angle $\theta 1$ ($\theta 1 > \theta 2$). An elevation angle formed between the first opposing surface 31 and the second opposing surface 41 when the first opposing surface 31 and the second opposing surface 41 are in contact with each other at only the intersection point P4 is defined as a third angle $\theta 3$. When $\theta 1 > \theta 3 > \theta 2$ holds, although the male power terminal 32b and the male signal terminal 33 are in contact with the second opposing surface 41 of the second connector 4, the male power terminal 32a is not in contact with the second opposing surface 41. That is, although the male power terminal 32b is connected to the female power terminal 42b, and the male signal terminal 33 is connected to the female signal terminal 43, the male power terminal 32a is not connected to the female power terminal 42a.

Thus, when $\theta 1 > \theta 2$ holds, one of the pairs of the male power terminals 32 and the female power terminals 42 could be disconnected, and another pair could be connected in some cases. While the first connector 3 and the second connector 4 are conducted, when one of the pairs of the male power terminals 32 and the female power terminals 42 is disconnected, and another one of the pairs is connected, current may be concentrated on the connected pair, which may cause the temperature to be excessively increased at the connected power terminal pair.

FIG. 10 is illustrated in a deformed manner in such a way that the lengths of the male power terminals 32 (32a and 32b) and the male signal terminal 33 in the projecting direction become longer than a diameter of the first connector 3. Therefore, in the second connector 4, the positions of the female power terminals 42 (42a and 42b) and the female signal terminal 43 are drawn in a distorted manner. However, in practice, the lengths of the male power terminals 32 (32a and 32b) and the male signal terminal 33 in the projecting direction are shorter than the diameter of the first connector 3 and shorter than the illustration of FIG. 10. Thus, in the second connector 4, distortion of the positions of the female power terminals 42 (42a and 42b) and the female signal terminal 43 hardly occurs.

On the other hand, as shown in FIG. 11, suppose that the lengths of the male power terminals 32 and the male signal terminal 33 in the projecting direction are set in such a way that the second angle θ2 becomes larger than the first angle θ1 (θ1<θ2). When the first opposing surface 31 and the second opposing surface 41 are in contact only at the intersection point P4, the male power terminal 32b is in contact with the second opposing surface 41 of the second connector 4 if θ1<θ3 holds, but the male signal terminal 33 and the male power terminal 32a are not in contact with the second opposing surface 41. That is, the male signal terminal 33 is not connected to the female signal terminal 43, and thus the first connector 3 and the second connector 4 are not conducted.

Further, when θ1<θ3 holds, the male signal terminal 33 is connected to the female signal terminal 43, and the first connector 3 and the second connector 4 are conducted. However, when the male signal terminal 33 is connected to the female signal terminal 43, all the pairs of the male power terminals 32 and the female power terminals 42 are connected. Thus, when the male signal terminal 33 and the female signal terminal 43 are connected to each other, and the first connector 3 and the second connector 4 are conducted, it is possible to prevent one of the pairs of the male power terminals 32 and the female power terminals 42 from being disconnected, and current from being concentrated on the other pair, and thereby preventing the temperature from excessively rising.

Like FIG. 10, FIG. 11 is illustrated in a deformed manner in such a way that the lengths of the male power terminals 32 (32a and 32b) and the male signal terminal 33 in the projecting direction become longer than the diameter of the first connector 3. For this reason, in practice, distortion of the positions of the female power terminals 42 (42a and 42b) and female signal terminal 43 like the one shown in FIG. 1l hardly occurs in the second connector 4.

Next, a method of setting the elastic force when the male power terminal 32 includes the elastic member 35 is described below. In the following description, a reference is made also to FIG. 2 as appropriate.

Figure 12:
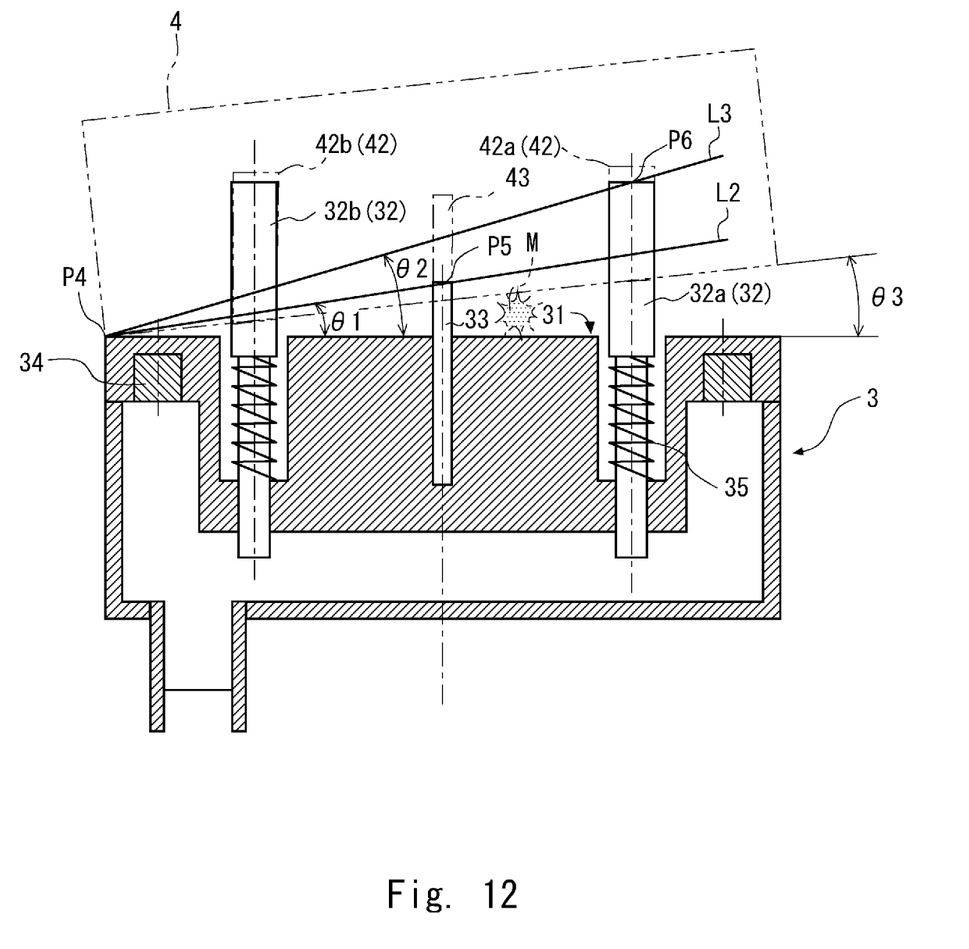
FIG. 12 is a schematic view for describing a method of setting an elastic force when the male power terminal includes an elastic member.

FIG. 12 is a schematic view for describing the method of setting the elastic force when the male power terminal 32 includes the elastic member 35. As shown in FIG. 12, when a foreign matter M is sandwiched between the first connector 3 and the second connector 4, the first opposing surface 31 of the first connector 3 and the second opposing surface 41 of the second connector 4 cannot be completely brought close to each other. Specifically, only a part of the second opposing surface 41 is in physical contact with the outer edge of the first opposing surface 31. However, when the third angle θ3 is smaller than the first angle θ1 (when θ1>θ3 holds), the male signal terminal 33 and the female signal terminal 43 are connected to each other, and the first connector 3 and the second connector 4 are conducted. Then, current flows through all of the pairs of the male power terminals 32 and the female power terminals 42.

The elastic member 35 is, for example, a coil spring, and is in an expanded state when the male power terminals 32 are not fitted into the female power terminals 42. When the male power terminals 32 are fitted into the female power terminals 42, the elastic member 35 exerts the elastic force in a direction in which the male power terminals 32 projects from the first opposing surface 31. That is, when the male power terminals 32 are inserted into the female power terminals 42, the male power terminals 32 are pressed against the female power terminals 42 by the elastic force of the elastic member 35. The closer the first opposing surface 31 is to the second opposing surface 41, the greater the elastic force of the elastic member 35 becomes, and the stronger the male power terminals 32 pressed against the female power terminals 42. Then, an electrical contact resistance between the male power terminals 32 and the female power terminals 42 is reduced. The smaller the contact resistance, the smoother the current flows between the male power terminals 32 and the female power terminals 42.

When the first opposing surface 31 cannot be completely brought close to the second opposing surface 41, such as when the foreign matter M is sandwiched therebetween, the electrical contact resistance between the male power terminals 32 and the female power terminals 42 is larger than that when the first opposing surface 31 and the second opposing surface 41 are completely brought close to each other. That is, current is hard to flow between the male power terminals 32 and the female power terminals 42. For this reason, when the male power terminals 32 and the female power terminals 42 are conducted in a state in which the electrical contact resistance between the male power terminals 32 and the female power terminals 42 is larger than the predetermined value, the temperature of parts where the male power terminals 32 are in contact with the female power terminals 42 may excessively rise.

In order to prevent this, when the third angle θ3 is smaller than the first angle θ1 in a state in which a part of the second opposing surface 41 is in physical contact with the outer edge of the first opposing surface 31, the elastic force (an elastic coefficient) of the elastic member 35 is set in such a way that the contact resistance between the male power terminals 32 and the female power terminals 42 becomes smaller than the predetermined value. By doing so, even when the male power terminals 32 and the female power terminals 42 are conducted in a state in which the first opposing surface 31 and the second opposing surface 41 cannot be completely brought close to each other, such as when the foreign matter M is sandwiched therebetween, it is possible to effectively prevent the temperature of the parts where the male power terminals 32 are in contact with the female power terminals 42 from excessively rising.

Like FIG. 10, FIG. 12 is illustrated in a deformed manner in such a way that the lengths of the male power terminals 32 (32a and 32b) and the male signal terminal 33 in the projecting direction become longer than the diameter of the first connector 3. For this reason, in practice, distortion of the positions of the female power terminals 42 (42a and 42b) and female signal terminal 43 like the one shown in FIG. 12 hardly occurs in the second connector 4.

The present disclosure is not limited to the above embodiment and can be appropriately modified without departing from the scope of the present disclosure.

In the above embodiment, as shown in FIGS. 3 to 6, although the opposing surface of the first connector 3 including the male power terminals 32 and the male signal terminal 33 is defined as the first opposing surface, and the opposing surface of the second connector 4 including the female power terminals 42 and the female signal terminals 43 is defined as the second opposing surface, the configurations thereof may be reversed. That is, the opposing surface of the first connector 3 may be defined as the second opposing surface including the female power terminals 42 and the female signal terminal 43, and the opposing surface of the second connector 4 may be defined as the first opposing surface including the male power terminals 32 and the male signal terminal 33.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A charger comprising:
a first connector provided on a power supply side; and
a second connector provided on a moving body side, wherein
the charger is configured to be charged in a state in which the first connector and the second connector are connected to each other by a magnetic force,
the first connector and the second connector include opposing surfaces facing each other,
one of the opposing surface of the first connector and the opposing surface of the second connector includes, on a first opposing surface, a male power terminal and a male signal terminal for a power cutoff signal projecting from the first opposing surface, and the other one of the opposing surface of the first connector and the opposing surface of the second connector is provided with a female power terminal which the male power terminal is to be fitted into and a female signal terminal which the male signal terminal is to be fitted into on a second opposing surface,
a length of the male signal terminal in a direction in which the male signal terminal projects is shorter than a length of the male power terminal in a direction in which the male power terminal projects,
wherein when the connection between the first connector and the second connector is disconnected while charging, the connection between the male signal terminal and the female signal terminal is disconnected, and the current supply from the power supply to the first connector is cut off by a current cutoff mechanism before the male power terminal is disconnected from the female power terminal.

2. The charger according to claim 1, wherein
on the first opposing surface, the male signal terminal is disposed at a central part, and a plurality of the male power terminals are disposed on a circumference centered on the central part,
on the second opposing surface, the female signal terminal is disposed at a central part, and a plurality of the female power terminals are disposed on a circumference centered on the central part,
when a straight line passing two points of a position of the male signal terminal and a position of the male power terminal on the first opposing surface is defined as a first straight line, a straight line passing two points of an intersection point between the first straight line and an outer edge of the first opposing surface and a leading end of the male signal terminal is defined as a second straight line, and a straight line passing two points of the intersection point and a leading end of the male power terminal is defined as a third straight line,
the length of the male power terminal in the direction in which the male power terminal projects and the length of the male signal terminal in the direction in which the male signal terminal projects are set in such a way that a second angle, which is an elevation angle formed between the first opposing surface and the third straight line, becomes greater than a first angle, which is an elevation angle formed between the first opposing surface and the second straight line.

3. The charger according to claim 2, wherein
the male power terminal includes an elastic member exerting an elastic force in the direction in which the male power terminal projects from the first opposing surface, and
when a third angle, which is an elevation angle formed between the first opposing surface and the second opposing surface, is smaller than the first angle in a state in which a part of the second opposing surface is physically in contact with the outer edge of the first opposing surface, the elastic force of the elastic member is set in such a way that a contact resistance between the male power terminal and the female power terminal becomes smaller than a predetermined value.

4. A charger comprising:
a first connector provided on a power supply side; and
a second connector provided on a moving body side, wherein
the charger is configured to be charged in a state in which the first connector and the second connector are connected to each other by a magnetic force,
the first connector and the second connector include opposing surfaces facing each other,
one of the opposing surface of the first connector and the opposing surface of the second connector includes, on a first opposing surface, a male power terminal and a male signal terminal for a power cutoff signal projecting from the first opposing surface, and the other one of the opposing surface of the first connector and the opposing surface of the second connector is provided with a female power terminal which the male power terminal is to be fitted into and a female signal terminal which the male signal terminal is to be fitted into on a second opposing surface, and
a length of the male signal terminal in a direction in which the male signal terminal projects is shorter than a length of the male power terminal in a direction in which the male power terminal projects,
wherein on the first opposing surface, the male signal terminal is disposed at a central part, and a plurality of the male power terminals are disposed on a circumference centered on the central part,
wherein on the second opposing surface, the female signal terminal is disposed at a central part, and a plurality of the female power terminals are disposed on a circumference centered on the central part,
wherein when a straight line passing two points of a position of the male signal terminal and a position of the male power terminal on the first opposing surface is defined as a first straight line, a straight line passing two points of an intersection point between the first straight line and an outer edge of the first opposing surface and a leading end of the male signal terminal is defined as a second straight line, and a straight line passing two points of the intersection point and a leading end of the male power terminal is defined as a third straight line, wherein the length of the male power terminal in the direction in which the male power terminal projects and the length of the male signal terminal in the direction in which the male signal terminal projects are set in such a way that a second angle, which is an elevation angle formed between the first opposing surface and the third straight line, becomes greater than a first angle, which is an elevation angle formed between the first opposing surface and the second straight line.

5. The charger according to claim 4, wherein the male power terminal includes an elastic member exerting an elastic force in the direction in which the male power terminal projects from the first opposing surface, and when a third angle, which is an elevation angle formed between the first opposing surface and the second opposing surface, is smaller than the first angle in a state in which a part of the second opposing surface is physically in contact with the outer edge of the first opposing surface, the elastic force of the elastic member is set in such a way that a contact resistance between the male power terminal and the female power terminal becomes smaller than a predetermined value.

* * * * *

UNITED STATES PATENT AND TRADEMARK OFFICE
CERTIFICATE OF CORRECTION

PATENT NO. : 10,897,106 B2  
APPLICATION NO. : 16/524579  
DATED : January 19, 2021  
INVENTOR(S) : Taguchi It is certified that error appears in the above-identified patent and that said Letters Patent is hereby corrected as shown below:

In the Specification

In Column 7, Line(s) 53, after "FIG.", delete "1l" and insert --11-- therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*